United States Patent [19]

Hester et al.

[11] Patent Number: 4,547,974

[45] Date of Patent: Oct. 22, 1985

[54] DYNAMIC ALIGNMENT FIXTURE

[75] Inventors: Troy L. Hester, Tuscaloosa; Steven J. Thompson, University; James R. Long, Madison, all of Ala.

[73] Assignee: The United States of America as represented by the Secretary of the Army, Washington, D.C.

[21] Appl. No.: 652,258

[22] Filed: Sep. 20, 1984

[51] Int. Cl.⁴ .......................... G01B 3/56; G01B 5/24
[52] U.S. Cl. ...................................................... 33/537
[58] Field of Search ............. 33/1 N, 174 S, 174 TA, 33/174 TB, 174 TC, 174 TD; 269/60

[56] References Cited

U.S. PATENT DOCUMENTS

| | | | |
|---|---|---|---|
| 2,397,300 | 3/1946 | Tilton | 33/174 S |
| 2,771,821 | 11/1956 | Beusch | 33/174 S |
| 3,090,127 | 5/1963 | Goyeneche | 33/174 S |
| 3,195,238 | 7/1965 | Grenell | 33/174 S |
| 3,788,633 | 1/1974 | Cho | 33/174 S |
| 3,924,338 | 12/1975 | Kindl | 33/174 TC |
| 4,238,888 | 12/1980 | Goldsmith | 33/174 S |

Primary Examiner—Richard R. Stearns
Attorney, Agent, or Firm—Anthony T. Lane; Robert P. Gibson; James T. Deaton

[57] ABSTRACT

A dynamic alignment fixture which has a pivot plate which is adapted to have a rate gyro mounted thereon and a base which is adapted to be mounted on a rate table with means for adjusting the pivot plate relative to the base plate and rate table to allow for the testing of the amount of misalignment of an input axis of the rate gyro that is mounted thereon to allow misalignment data to be gathered on high-drift-rate gyros.

4 Claims, 5 Drawing Figures

DYNAMIC ALIGNMENT FIXTURE

DEDICATORY CLAUSE

The invention described herein may be manufactured, used, and licensed by or for the Government for governmental purposes without the payment to us of any royalties thereon.

BACKGROUND OF THE INVENTION

In the past, the measurement of misalignment of an input axis of a gyro has been accomplished by placing shims under one side or edge of the gyro instrument and after placing the shims thereunder measuring the output to see if the output has been nulled. This previous method of misalignment measurement necessitates stopping the rate table on which the gyro is mounted in order to add or substract shims and this approach is also only valid for low-drift-rate gyros. Therefore, it can be seen that a fixture or device is needed in which misalignment of a gyro axis can be measured without having to stop the rate table or without having to add or substract shims in a trial and error approach.

Therefore, it is an object of this invention to provide a dynamic alignment fixture on which a rate gyro can be mounted and a fixture which can be mounted on a rate table for adjustment of the rate gyro relative to the rate table until the gyro is nulled.

Another object of this invention is to provide a dynamic alignment fixture that utilizes a screw-jack assembly for adjusting the position of the rate gyro.

Still another object of this invention is to provide a dynamic alignment fixture that can be adjusted as the rate table is rotating.

Other objects and advantages of this invention will be obvious to those skilled in this art.

SUMMARY OF THE INVENTION

In accordance with this invention, a dynamic alignment fixture is provided that includes a base plate that is adapted to be mounted on a rate table and the base plate has a pivot plate pivotably mounted above the base plate at one end by a precision hinge and at an opposite end of the pivot plate a screw jack assembly mounted on the base plate supports the pivot plate for adjustment about the pivot axis, and a resolution displacement gauge is mounted on the pivot plate to indicate the amount of movement thereof with the gauge being mounted on the same end as the jack screw assembly.

DESCRIPTION OF THE PREFERRED EMBODIMENT

Figure 1:
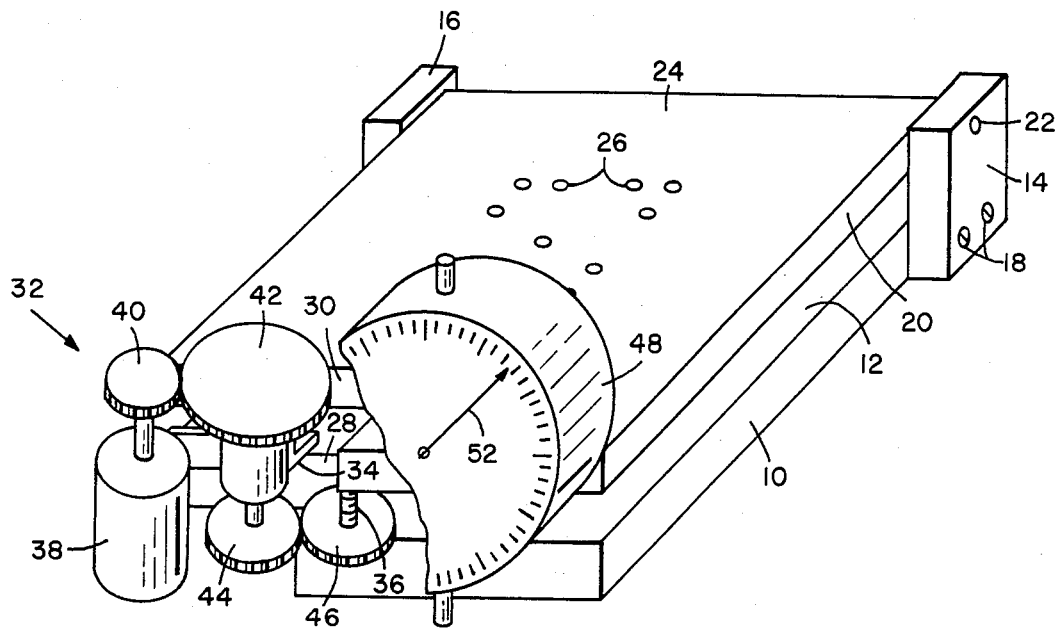
FIG. 1 is a perspective view with portions cut-away and illustrating the dynamic alignment fixture in accordance with this invention.
Figure 2:
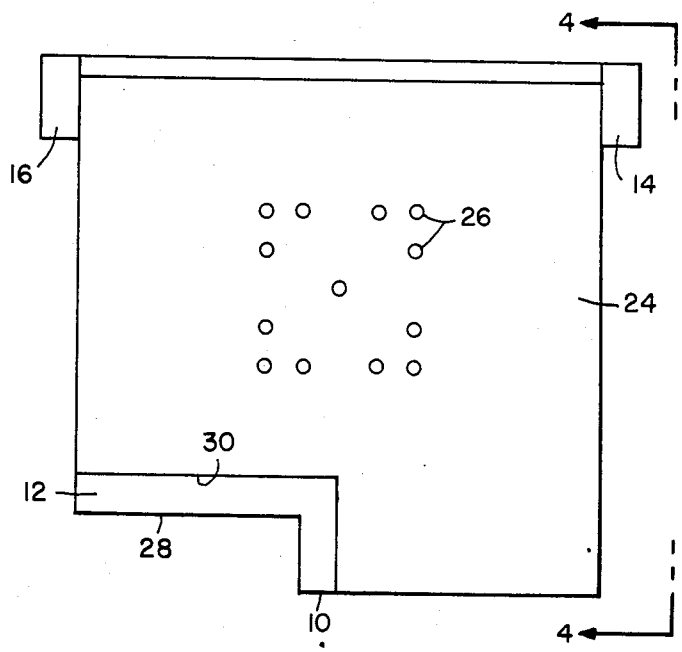
FIG. 2 is a top view of the base plate with the pivot plate pivoted thereon.
Figure 3:
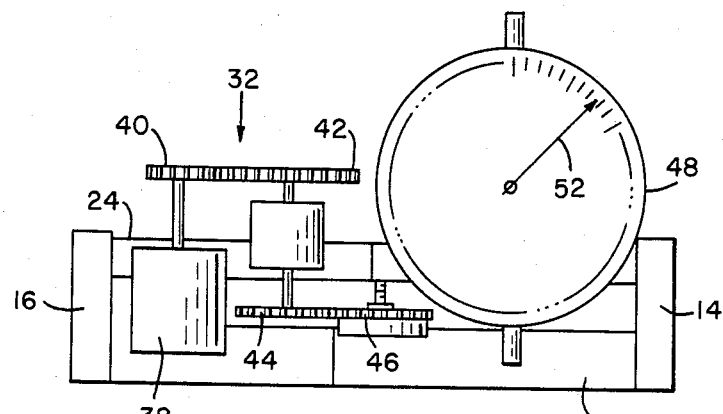
FIG. 3 is an end view of the alignment fixture in accordance with this invention.
Figure 4:
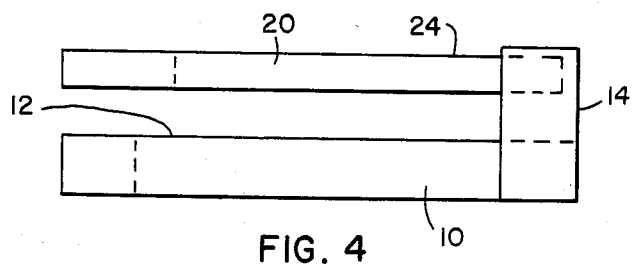
FIG. 4 is a view along line 4—4 of FIG. 2.

Referring now to the drawings, a dynamic alignment fixture in accordance with this invention includes a base plate 10 that has an upper flat surface 12 as well as a flat base surface. Pivot support members 14 and 16 are secured to base 10 in a conventional manner as illustrated at 18. A pivot plate 20 is mounted above base plate 10 at one end by a precision hinge 22. Pivot plate 20 has a flat upper surface 24 with openings 26 therein for mounting of a rate gyro thereon. Base plate 10 has a notched-out portion 28 at one end and pivot plate 20 has a slightly larger notched out area 30. A screw-jack assembly 32 is secured to base plate 10 in a conventional manner such as by bracket means 34. Screw 36 of screw-jack assembly 32 supports one end of pivot plate 20 and an electric motor 38 that can be driven in opposite directions through gears 40, 42, 44 and 46 is used to adjust screw 36 up and down to adjust pivot plate 20 about pivot 22 for adjusting the pivot plate relative to base plate 10. A 0.0001 inch resolution displacement gauge 48 is mounted by bracket means 50 (see FIG. 5) to pivot plate 20. Displacement gauge 48 has an indicator 52 for indicating the position of pivot plate 20 relative to base plate 10.

In operation, when it is desired to test for the amount of mis-alignment of an input axis to a gyro, the gyro is connected to or fastened on pivot plate 20 at openings 26 in a conventional manner. The dynamic alignment fixture is then mounted on a rate table in a conventional manner. With the dynamic alignment fixture mounted on the rate table, base plate 10 and pivot plate 20 are adjusted to be parallel. This is done by adjusting screw 36 using motor 38 to place base plate 10 and pivot plate 20 in a parallel position. With this accomplished, the displacement reading on indicator 48 is noted and recorded. While the rate table is stationary, an output from the gyro under test is noted and recorded. The sensitive axis of the gyro under test should be nominally orthogonal to the spin axis of the rate table and pivot axis 22 of pivot plate 20. The rate table is then started and motor 38 is operated to tilt the gyro mounted on pivot plate 20 until the output from the gyro reads the same as the previously recorded value. The rate table is than stopped and the reading of displacement indicator 48 is read and recorded. The angle of misalignment in one coordinate can then be determined by geometric analysis by using the equation:

$$\theta = \mathrm{Tan}^{-1}(\Delta X/A).$$

Figure 5:
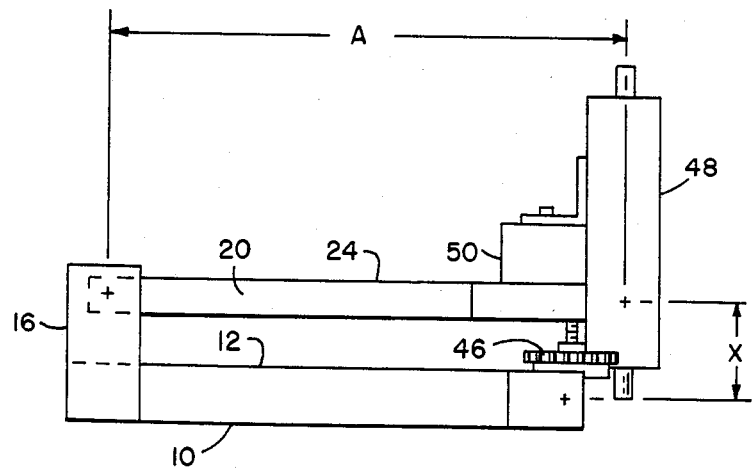
FIG. 5 is a schematic illustration illustrating the measurements that are used to calculate the amount of pivoting of the pivot plate relative to the base plate.

The distances A and X are illustrated in FIG. 5.

The previous method of misalignment measurement involved placing shims under one end of the gyro to adjust its position and then measuring the output thereof as it is rotated on the rate table. This trial-and-error approach, necessitates stopping the rate table to add or subtract shims, and is valid for low-drift-rate gyros only. As the drift rate of the rate gyro is increased, the time to change the angles and make the trial and error evaluations becomes more critical. The apparatus of this invention and the procedure utilized therein eliminates the need for stopping the rate table and this greatly decreases the time between trials, improves accuracy, and reduces errors associated with drift. The dynamic alignment fixture according to this invention allows misalignment data to be gathered on high-drift-rate gyros where the shim method is not feasible. Also, the fixture in accordance with this invention can induce an angle to the rate gyro under test while the rate table is being operated or rotated (hence dynamic).

We claim:

1. A dynamic alignment fixture comprising a base plate having surfaces thereon, a pivot plate having a top flat surface and being pivotably mounted at one end to one end of said base plate with said pivot plate positioned over said base plate, a resolution displacement gauge mounted to said pivot plate at the other end thereof and said gauge having an indicator for indicating the position of said pivot plate relative to said base plate, and a motor driven screw-jack assembly means mounted at the other end of said base plate and having a screw that can be adjusted up and down relative to said pivot plate for adjusting said pivot plate to raise or lower said pivot plate relative to said base plate to cause it to pivot about its pivot mounting at said one end.

2. A dynamic alignment fixture as set forth in claim 1, wherein said pivot plate has means at an upper surface thereof to which a rate gyro can be secured.

3. A dynamic alignment fixture as set forth in claim 2, wherein said base plate and said pivot plate each have notched out portions at said other end and said motor drive screw-jack assembly means is mounted at said notched out portions of said base plate and said pivot plate.

4. A dynamic alignment fixture as set forth in claim 3, wherein said screw-jack assembly means is mounted by bracket means to said base plate and said screw-jack assembly means includes reduction gearing which innerconnects the motor to said screw.

* * * * *